Nov. 7, 1939.   A. D. BLUMLEIN   2,178,985
THERMIONIC VALVE CIRCUIT
Filed Aug. 30, 1935
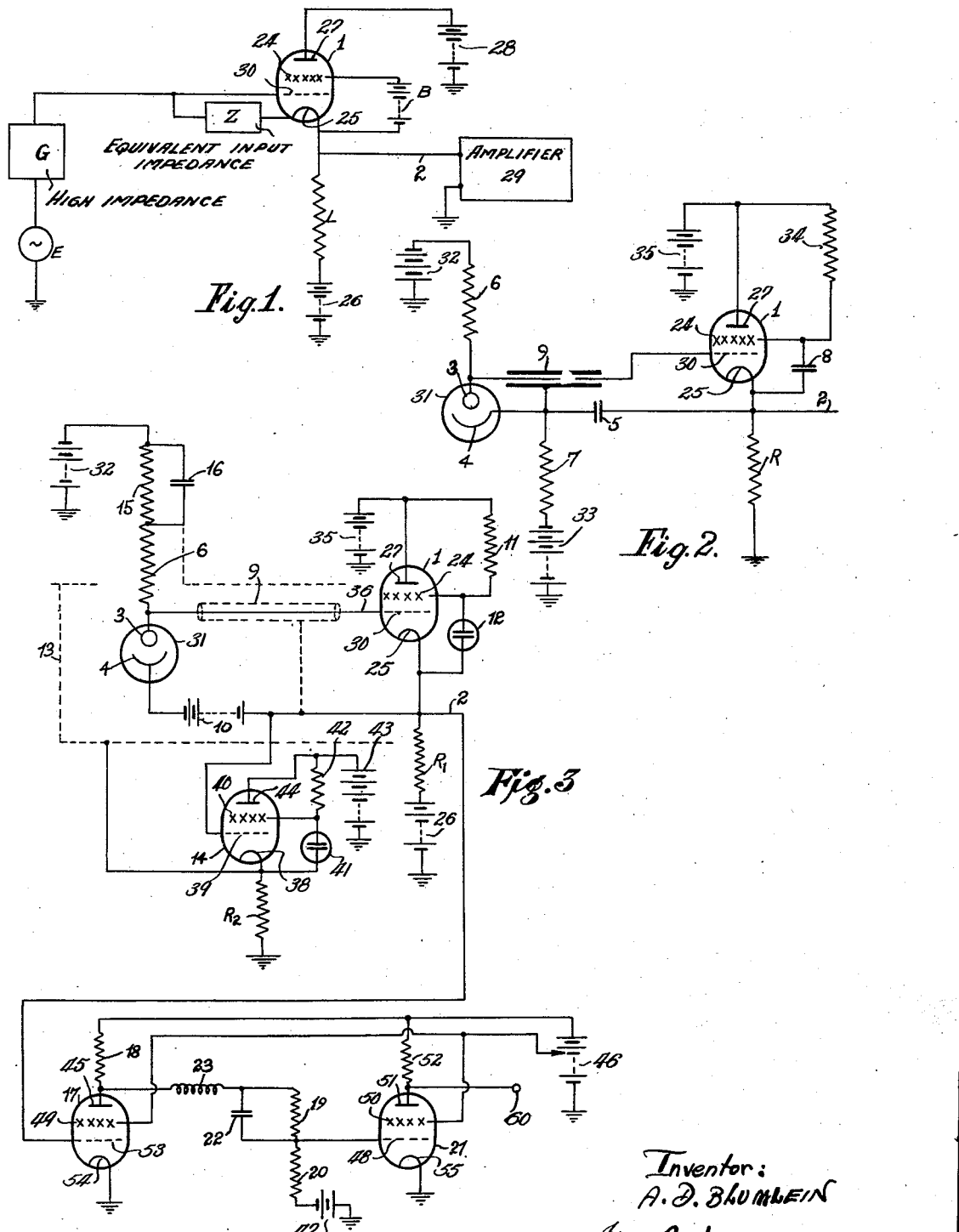

Patented Nov. 7, 1939

2,178,985

UNITED STATES PATENT OFFICE 2,178,985

THERMIONIC VALVE CIRCUIT

Alan Dower Blumlein, Ealing, London, England, assignor to Electric & Musical Industries Limited, Hayes, Middlesex, England, a company of Great Britain Application August 30, 1935, Serial No. 38,631
In Great Britain September 4, 1934

15 Claims. (Cl. 179—171)

The present invention relates to thermionic valve circuits.

In working many electrical devices into the input of an amplifier, it is known that the finite input impedance of the first valve (e. g., grid capacity), and the stray capacities and self capacities associated with the input circuit seriously limit the amount of signal that can be obtained. A typical instance of this occurs with a photo-cell as used for picking up the light for television transmission. In such a case the photo-cell may have a self capacity of say 10 micro-microfarads, and the input capacity of the valve may account for another 15 micro-microfarads, giving, with the addition of 5 micro-microfarads of stray capacity, a total input capacity of 30 micro-microfarads.

If such a device is to be employed to handle frequencies up to 500 kc., a feed resistance to the photo-cell greater than 10,000 ohms cannot be employed without serious loss of the upper frequencies. It is however advantageous to employ a resistance greater than this value to feed the photo-cell in order to obtain the best possible noise to signal ratio from the circuit, since by using a high resistance it is possible to obtain the maximum signal at the upper frequencies to overcome the "shot noise" of the valve, and at the same time the effect of the Johnson noise due to the resistance is reduced.

In such a system an increased response is obtained at the lower frequencies and it is necessary to correct for the relative top loss in later stages of the amplifier. This correction is dependent on the value of the capacity of the photo-cell, valve and wiring, and any change in these components usually involves a change in the amount of top correction applied. Similar troubles occur when devices other than photo-cells are used operating into the grid circuit of a valve, and the difficulty may be due not only to capacity, but also to leakage resistance. Thus if the leakage resistance of the grid-cathode path of the valve is not very much greater than the feed resistance, the low frequency and D. C. response will be affected by this leakage and any variation, either with time or due to changing the valve, will alter the amount of amplification and high frequency correction required in the later stages of the amplifier.

It is an object of this invention to provide means whereby the apparent input impedance of a valve, and in certain cases the shunt impedance of the device driving it, is considerably increased, thus enabling distortionless operation from input impedances which would otherwise be seriously shunted by the valve impedance or shunt impedance of the device under consideration.

According to the present invention there is provided a thermionic valve circuit comprising a thermionic valve having a cathode, an anode and a control electrode, a loading impedance connected between said cathode and earth and an input circuit connected between the control electrode and earth and containing a source of electrical variations, wherein the conductance of said source, between said control electrode and earth, is less than the admittance of said valve between said control electrode and said cathode, at at least one frequency within the range of frequencies to be handled, the arrangement being such that the potential of said cathode varies in the same sense, and to an extent which is of the same order of magnitude, as the variations of potential of said control electrode, and that the effective input admittance of said valve is substantially less than the conductance of said source.

The source of variations is taken to include the source itself (such as a photo-electric cell) in which the variations are set up together with any load resistance. Thus the conductance of a source comprising a photo-electric cell and a load resistance is the resultant of the conductance of the load resistance and the conductance of the cell (the conductance being the reciprocal of the D. C. resistance). The shunt capacity of the source is not taken into account in determining the conductance. It is also to be understood that the capacity of wiring or the like associated with the input to the valve is to be included in the shunt capacity of the source or of the valve itself.

According to a feature of the present invention there is provided a thermionic valve circuit having an input circuit comprising a source of signals, a thermionic valve, and a resistance either in the source of signals or associated with the source wherein at the upper working frequencies the reactance of the capacity of the source or the valve is smaller than said resistance, characterised in that a load is arranged between the cathode and earth and that the arrangement is such that the effective capacity of the source, or the input capacity of the valve or both are substantially reduced.

According to a further feature of the present invention there is provided a thermionic valve circuit comprising a thermionic valve having a cathode, an anode and a control electrode, a loading impedance element connected between said cathode and earth and an input circuit connected between said control electrode and earth and containing a source of electrical variations, wherein the conductance of said source, between said control electrode and earth, is comparable with the admittance of said valve between control electrode and cathode or of said source, between said control electrode and earth, at at least one frequency within the range of frequencies to be handled, the arrangement being such that the effective capacity of the source or the effective input capacity of the valve or both are substantially reduced. It is to be understood that, for the purpose of this specification, one quantity is said to be comparable with another quantity if one of these quantities is not more than ten times the other.

According to yet a further feature of the present invention there is provided a thermionic valve circuit comprising a thermionic valve having a cathode, an anode and a control electrode, a loading impedance element connected between said cathode and earth and an input circuit connected between said control electrode and earth and containing a source of electrical variations, wherein the conductance of said source, between said control electrode and earth, is less than the admittance of said valve between said control electrode and said cathode, at at least one frequency within the range of frequencies to be handled, the arrangement being such that the potential of said cathode varies in the same sense, and to an extent which is of the same order of magnitude, as the variations of potential of said control electrode and that the probable changes of the input admittance of said valve are comparable with or substantially less than the conductance of said source. The probable changes of the input admittance of a valve are to be taken to mean variations due to deterioration of the valve or due to differences of input admittance of different samples either of the same type of valve or of similar types of valve.

According to another feature of this invention, various elements such as the shielding or other elements of the input circuit, are either connected to the cathode of the input valve, or are otherwise made to follow the potential of the control electrode or cathode of this valve in such a manner as to reduce effectively the shunting effect of any unwanted capacity or leakages associated with these screens or elements. The input valve may be provided with a screen or screens and/or guard rings, so arranged that the control electrode has only direct impedance to these screens or the cathode, so that by making these screens or guard rings follow the potential of the cathode, the total input impedance of the valve may be substantially increased. The output from the valve above described to a further valve may be taken from across the whole or a part of the impedance in the cathode circuit.

The invention will now be described by way of example with reference to the accompanying drawing, in which three circuits embodying the invention are shown diagrammatically.

Fig. 1 shows a simple circuit for increasing the input impedance of a valve; Fig. 2 shows a circuit arrangement in which correction is made for the input capacity of the valve and also for the shunt capacity of the photo-cell; Fig. 3 shows additional means for reducing the effect of the input capacity and also means for correcting the frequency response of the system.

Throughout this specification the term "earth" is used for convenience and must be given a wide interpretation. Any system of points may be considered as earth points if their relative potentials are incapable of any substantial variation at any frequency within the range of frequencies to be handled.

Referring to the drawing, Fig. 1 shows a simple circuit illustrating the operation of this invention. The source of voltages to be amplified is shown as being equivalent to a generator E in series with a high impedance G. A valve 1 has its screen 24 conductively connected to the cathode 25 by means of a floating battery B. The cathode 25 is connected through an impedance L to a suitable source of potential 26 which may be positive or negative, depending on the required bias of the valve 1. The anode 27 is connected to the positive terminal of a source of high tension 28, the negative terminal of which is earthed. The signal output is taken from the cathode 25 along the lead 2 to a further amplifier 29 which may be of known type. An impedance $z$ is shown to represent the input impedance of the valve 1 between grid 30 and cathode 25. This impedance includes the impedance of the grid to the screen. It is assumed that the valve 1 is so arranged that there is no appreciable direct leakage or capacity between the grid 30 and any elements other than the screen 24 and cathode 25. If the impedance L is high compared to the inverse of the mutual conductance of the valve 1, the potential of the cathode 25 will tend to follow the potential variations of the grid 30.

Suppose for example, that a change of 1 volt in the positive direction on the grid 30 causes a change in cathode potential of 0.99 volt in the same direction, the potential difference across the input impedance $z$ will only be 0.01 volt, so that the current drawn by the impedance $z$ will only be 100th of what it would have been if the cathode 25 had not followed the potential of the grid 30. The effective input impedance of the valve will then be 100 times as great as it would have been with fixed cathode and screen potentials.

If now the impedance G is large compared to the impedance $z$, but is smaller than the impedance 100 $z$, then a substantially faithful copy of the generator voltage is obtained on the grid whereas this would not have been the case if the cathode potential had been fixed. The voltage amplification obtained by the valve 1 may be in the neighborhood of unity or less but the valve nevertheless enables the full E. M. F. to be obtained from the high impedance G.

The output potential difference developed across the impedance L may be taken by lead 2 to the grid circuit of a valve worked in a normal manner, since the impedance looking back along this lead will be approximately the inverse of the mutual conductance of the valve in parallel with L; this impedance will be much less than the normal input impedance of the next valve.

Alternatively, a resistance may be connected in the anode circuit of this valve and the output may be taken from across this anode resistance, but any attempt to obtain amplification in this manner will tend to decrease the effective input impedance of the valve due to the failure of the cathode to follow the grid potential satisfactorily.

It would at first sight appear that an improvement to the essential signal to noise ratio (due to the "shot noise" of the valve) is obtained. This however is not the case, since if the impedance G is greater than z, the reduction of "shot" current due to the negative reaction of the high impedance cathode load and the apparently fixed grid potential, will not be realized because the grid potential will tend to follow any variations of cathode potential produced by valve noise.

The method of operating an input valve above described provides a means by which the effect of the input impedance of the valve can be eliminated as regards its effect on the amplication characteristic, but the method does not eliminate the harmful effect of this input impedance on the noise introduced by the valve. If the high impedance input circuit G were associated with a valve of input impedance z, variable with frequency, having its cathode potential fixed, it would be necessary to provide suitable correction in the amplifier subsequent to this valve to allow for the shunting effect of the input impedance z. Any change in the constant G and z would involve a change in the correction. This invention provides a method by which this correction is in effect applied in the first valve by means of components which do not require to be adjusted to suit the particular correction obtained. In effect the valve constitutes a negative reaction circuit which automatically corrects for the loss due to the input impedance of the valve.

Fig. 2 shows a circuit by which not only is correction made for the input capacity of the valve, but also for the shunt capacity of the photo-cell 31 from which it is fed. In this case, the photo-cell anode 3 is connected to the grid 30 of the valve 1 and the photo-cell cathode 4 is conected through a condenser 5 to the cathode 25 of the valve 1, the cathode 25 being connected through a comparatively high resistance R to earth. The anode 3 of the photo-cell 31 is connected through a resistance 6 to a suitable source of grid bias potential 32, the other terminal of which is earthed. The cathode 4 of the photo-cell 31 is connected through a resistance 7 to the negative terminal of a high potential source 33 the positive terminal of which is earthed for polarising the photo-cell. The screen grid 24 of the input valve 1 is fed through a high resistance 34 from a source of potential 36 the negative terminal of which is earthed. A condenser 8 is connected between screen grid 24 and the cathode 25. The anode 27 of valve 1 is also connected to source 35.

The condensers 5 and 8 are sufficiently large to ensure that as regards the relevant A. C. frequencies, the cathode 4 of the photo-cell 31 and the screen of the valve 1 follow at least approximately the potential of the cathode 25 of this valve. If desired, a screen 9 may encircle the lead joining the anode 3 of photo-cell 31, and the grid 30 of the valve 1. This screen is thus made to follow the A. C. potential of the cathode 25 of the valve 1. The screen may be further extended so that there is very little direct capacity between the circuit of the anode 3 and earth.

By the means shown in Fig. 2, the effective input capacity of the valve 1, including the photo-electric cell capacity, stray wiring capacities and the grid capacity of the valve is reduced to say 1/10 of its normal value. For the case cited at the beginning of this specification, this would reduce the effective input capacity from 30 micro-microfarads to 3 micro-microfarads, which would enable the anode resistance of the photo-cell to be increased from 10,000 ohms to 100,000 ohms while maintaining the characteristic substantially flat up to 500 kc. This value of anode resistance for the photo-cell would probably be sufficient to ensure that the noise obtained is almost entirely due to the unavoidable "shot" noise of the valve 1. In effect an amplification of 10:1 would be obtained from this valve at the higher frequencies, since the use of this valve has enabled the resistance 6 to be increased 10 times. The reduction of the effective capacity of the photo-cell is only possible by virtue of the fact that the photo-cell is voltage saturated, that is to say the current through the cell for any given illumination does not vary with the voltage applied across the cell, and therefore the current received by the anode 3 is independent of the potential of the cathode 4, except for any capacity effect between these two elements.

This method of working is applicable to other devices where the D. C. potential of the electrode from which signals are drawn does not materially affect the current flowing to that electrode, i. e., where the device has a very high internal impedance apart from self capacity or conductive leakage.

Fig. 3 shows a photo-cell with three stages of a subsequent amplifier. There is provided a photo-cell 31 having anode 3 and cathode 4, the anode being fed through a resistance 6 from a source 32. The anode 3 is connected directly to the grid 30 of the input valve 1 and the connecting lead 36 may be shielded by a screen 9 connected to the cathode 25 of the valve 1. The cathode 4 of the photo-cell is polarised by a floating battery 10, which is connected between it and the cathode 25 of the valve 1. This cathode is connected through a high cathode loading resistance R₁ to a suitable source of biasing potential 26. The screen 24 of the valve 1 is connected through a neon tube 12 or other gaseous discharge tube or similar potential stabilising device, to the cathode 25 and is fed through a resistance 11 from a source 35 to which anode 27 is also connected. The polarising battery 10 and the neon tube 12 have been substituted for the condensers 5 and 8 in Fig. 2, since it is required to handle all frequecies down to direct current.

In order to reduce the effects of the capacity to ground of the screen 9 and other equipment connected to the cathode of the valve 1, from loading the cathode too severely, a further screen 13 is arranged external to the cathode circuit of the valve 1 and this screen may if desired embrace the valve 1 itself. The screen 13 is caused to follow the cathode 25 of the valve 1 by being connected to the cathode 38 of a valve 14 whose grid 39 is connected to the cathode 25 of the valve 1 and whose cathode circuit is provided with a resistance R₂. The screen grid 40 of valve 14 is connected through a neon tube 41 to the cathode 38 and through a resistance 42 to a source of potential 43 to which anode 44 is also connected. This valve 14 is a "follower" valve operating in the same manner as valve 1, and serves to reduce the general capacity load on the cathode of the valve 1. The anode 3 of the photo-cell is supplied with current through the resistance 6, which, owing to the reduced input capacity from the photo-cell, may be higher than would otherwise be necessary for obtaining a flat characteristic. This resistance is fed from a further resistance 15 which is shunted by a condenser 16. Possible values may here be resistance 6—100,000 ohms, resistance 15—2 megohms and condenser 16—0.006 microfarad.

The resistance 15 and condenser 16 serve to give an enhanced response for the very low frequencies, so that the input to the valve 1 from the photocell at these frequencies is large compared to the effect of any random variation of battery potentials or valve characteristics. The cathode of the valve 1 is connected over the lead 2 to the grid 53 of the valve 17. The anode 45 of valve 17 is fed through a resistance 18 from a source of potential 46. Anode 45 feeds a potentiometer consisting of resistances 19 and 20 connected in series. The lower end of resistance 20 is taken to a biasing battery 47 for supplying a suitable negative potential to the grid 48 of the subsequent valve 21. The screen grids 49, 50 of valves 17, 21 are connected to suitable points in source 46 and anode 51 of valve 21 is connected through a resistance 52 to source 46. The cathodes 54, 55 of valves 17, 21 are earthed.

Resistances 18 and 20 in parallel may for example have a value of the order of 4,200 ohms, and the valve 17 may have a mutual conductance of say 5.0 milliamps per volt. The resistance 19 is chosen so that for very low frequencies no amplification is obtained between the grids of the valves 17 and 21, the amplification being substantially that of valve 21. The condenser 22, which shunts the resistance 19, increases the amplification for the higher frequencies, so that at these frequencies amplification is obtained between the grids of valves 17 and 21 also.

By suitably proportioning the resistances 18, 19 and 20, and the condenser 22 with reference to 6, 15 and 16, the overall characteristic may be made flat and the output from the valve 21 will require no further correction. The small inductance 23 may be used to correct the high frequency loss produced by the capacities of the anode of valve 17, the grid of valve 21 and the associated coupling circuits.

The condenser 16 is arranged to be sufficiently large to prevent its value being substantially affected by any stray capacity bridged across it or by the self capacity of the resistance 15.

It will be noted that a comparatively high output is obtained from the photo-cell at very low frequencies. There is no amplification of this D. C. voltage previous to the grid of the valve 21, so that no instability will be obtained due to the slight variation of the biasing voltages etc. It should further be noted that all sources supplying biasing potentials etc. must have either very low regulation, or a resistive regulation substantially invariant with frequency.

The values given above are only given by way of example and, for instance, a much higher value may be found suitable for the photo-cell anode resistance 15. Also the correction for the loss due to condenser 16 can be effected in more than one stage by any of the well known methods.

It should be noted that, even if the leakage resistance between the grid and cathode of the valve 1 is comparable with the resistance 15, this leakage will not appreciably affect the output obtained from the valve 1, since there will be very little variable voltage operative across this leakage.

The valve 1 is conveniently constructed so that there can be no direct leakage from the anode or screen of the valve to the grid, which leakage might otherwise bias the grid very positively. Such leakage may be prevented by suitable guard rings connected either directly or through a small source of voltage to the cathode. If the heating battery or (in the case of an indirectly heated valve) the heating winding of the cathode of valve 1 introduces a large loading capacity across the cathode load of this valve, the heating battery or winding may be caused to follow the cathode potential by means of screens or connections to a "follower" valve such as 14.

The invention is described above with reference to a photo-cell which is typical of a high impedance device which requires an amplifying valve of very high input impedance. The invention is readily applicable to any other device where it is desired to obtain an effective high input impedance.

In the examples given, it is advantageous to choose for the valve 1 (as is known for the first stages of amplifiers) one having a high slope at low anode current and low capacities between grid and cathode and between grid and screen.

The present invention may be applied advantageously to the first amplifying valve following a television signal producing device of the type where a plurality of elements are exposed to light and are switched, for example by means of a cathode ray, successively to produce the required signal. In such an application it may be arranged that electrodes or elements of the transmitting device which have large capacity to the signal circuit may be made to follow the potential of the cathode of the first amplifying valve. Similarly, if a large D. C. output is required, it may be arranged that the potentials of certain electrodes "follow" in order to maintain equilibrium potential conditions in the device.

I claim:

1. A thermionic valve circuit comprising a thermionic valve having a cathode, an anode and a control electrode, an output load impedance, an input circuit comprising a source of electrical variations contained within a predetermined range of frequencies, said input circuit being connected between said control electrode and earth and having resistance and capacity, the reactance of the sum of the capacities of said source and of said valve between said control electrode and said cathode at a frequency within the predetermined range of frequencies being less than the resistance of said source, said output impedance being connected between said cathode and earth and proportioned to reduce the sum of the effective capacities of said source and of said valve.

2. A thermionic valve circuit comprising a thermionic valve having a cathode, an anode and a control electrode, an input circuit comprising a source of electrical variations contained within a predetermined range of frequencies, means connecting said input circuit between said control electrode and earth, and an input admittance reducing nonreactive loading element connected between said cathode and earth, a load circuit, and means to feed the load circuit only with potential variations occurring across the input admittance reducing element.

3. A thermionic valve circuit comprising a thermionic valve having a cathode, an anode and a control electrode, an input circuit comprising a source of electrical variations contained within a predetermined range of frequencies, means connecting said input circuit between said control electrode and earth, a conducting element the presence of which tends to increase the capacity of said input circuit, an input admittance reducing loading impedance element connected between said cathode and earth and means for causing the potential of said conducting element to follow at least approximately the potential of said cathode.

4. A thermionic valve circuit according to claim 3, wherein said conducting element is connected to said cathode through a path having a low impedance over said predetermined range of frequencies.

5. A thermionic valve circuit comprising a thermionic valve having a cathode, an anode and a control electrode, an input circuit comprising a source of electrical variations contained within a range of frequencies, means connecting said input circuit between said control electrode and earth, a screening element screening at least a part of said input circuit, a loading impedance element connected between said cathode and earth and means for causing the potential of said screening element to follow at least approximately the potential of said cathode.

6. A thermionic valve circuit according to claim 5, wherein said screening element is connected to said cathode through a path having a low impedance over said range of frequencies.

7. A thermionic valve circuit comprising a first thermionic valve having a cathode, an anode and a control electrode, an input circuit comprising a source of electrical variations contained within a predetermined range of frequencies, means connecting said input circuit between said control electrode and earth, a loading impedance element connected between said cathode and earth for reducing the effective value of the resultant of the admittances of said valve between control electrode and cathode and of said source, a conducting element the presence of which tends to increase the admittance of said input circuit, a second thermionic valve having a cathode, an anode and a control electrode, a coupling between the cathode of said second valve and said conducting element, a coupling between the cathode of said first valve and the control electrode of said second valve and a second loading impedance element connected between the cathode of said second valve and earth for causing the potential of said conducting element to follow at least approximately the potential of the control electrode of said second valve and thereby reducing said increase of the admittance of said input circuit.

8. A thermionic valve circuit according to claim 2, wherein said valve comprises a screen grid and wherein said valve circuit comprises a source of potential, an impedance element having a large impedance over said range of frequencies connected between the positive pole of said source and said screen grid, a connection between the negative pole of said source and earth and a potential stabilising device connected between said screen grid and cathode for stabilising the potential of said screen grid.

9. A thermionic valve circuit according to claim 7, wherein said second valve comprises a screen grid and wherein said valve circuit comprise a source of potential, an impedance element having a large impedance over said range of frequencies connected between the positive pole of said source and said screen grid, a connection between the negative pole of said source and earth and a potential stabilising device connected between said screen grid and cathode for stabilising the potential of said screen grid.

10. A thermionic valve circuit according to claim 2, wherein said valve comprises a screen grid and wherein said valve circuit comprises a source of potential, an impedance element having a large impedance over said range of frequencies connected between the positive pole of said source and said screen grid, a connection between the negative pole of said source and earth and a potential stabilising device comprising a gaseous discharge tube connected between said screen grid and cathode for stabilising the potential of said screen grid.

11. A thermionic valve circuit according to claim 7, wherein said second valve comprises a screen grid and wherein said valve circuit comprises a source of potential, an impedance element having a large impedance over said range of frequencies connected between the positive pole of said source and said screen grid, a connection between the negative pole of said source and earth and a potential stabilising device comprising a gaseous discharge tube connected between said screen grid and cathode for stabilising the potential of said screen grid.

12. The combination of a thermionic tube having a cathode, a control electrode and an anode, an input admittance-reducing nonreactive element connected to the cathode, a high impedance source of electrical energy of predetermined frequency range connected across the impedance and the control electrode, means to derive energy from the input admittance-reducing element only, and means for amplifying the derived energy.

13. The combination of a thermionic tube having a cathode, a control electrode and an anode, an input admittance-reducing nonreactive element connected to the cathode, a high impedance source of electrical energy of predetermined frequency range connected across the impedance and the control electrode, means to derive energy from the input admittance-reducing element only, means for amplifying the derived energy, and means to vary the amplification in accordance with the predetermined function of frequency.

14. The combination of a high impedance source of electrical energy, a thermionic tube having an input circuit, impedance means for increasing the effective input impedance of the thermionic tube, means connecting the high impedance source to the thermionic tube, means for shielding the connecting means, means for deriving energy from the impedance means, means to amplify the derived energy, means for varying the amplification of the energy in accordance with a predetermined function of frequency, and means to furnish the amplified energy to a load circuit.

15. The combination of a high impedance source of electrical energy, a thermionic tube having an input circuit, combined impedance and thermionic means for increasing the effective input impedance of the thermionic tube, means connecting the high impedance source to the thermionic tube, means for shielding the connecting means, means for deriving energy from the impedance means, means to amplify the derived energy, means for varying the amplification of the energy in accordance with a predetermined function of frequency, and means to furnish the amplified energy to a load circuit.

ALAN DOWER BLUMLEIN.